F. C. PARLIMAN.
FILING DEVICE FOR FINGER PRINT RECORDS.
APPLICATION FILED NOV. 16, 1915.
1,206,362.
Patented Nov. 28, 1916.
5 SHEETS—SHEET 2.
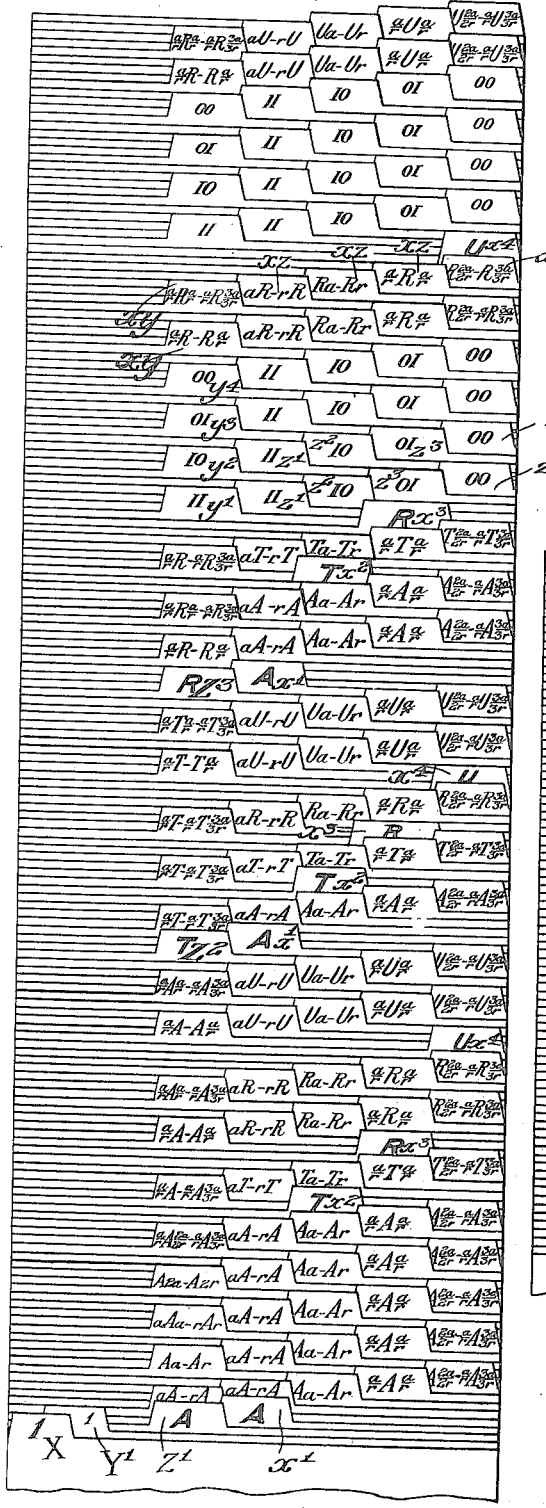
Fig. 2
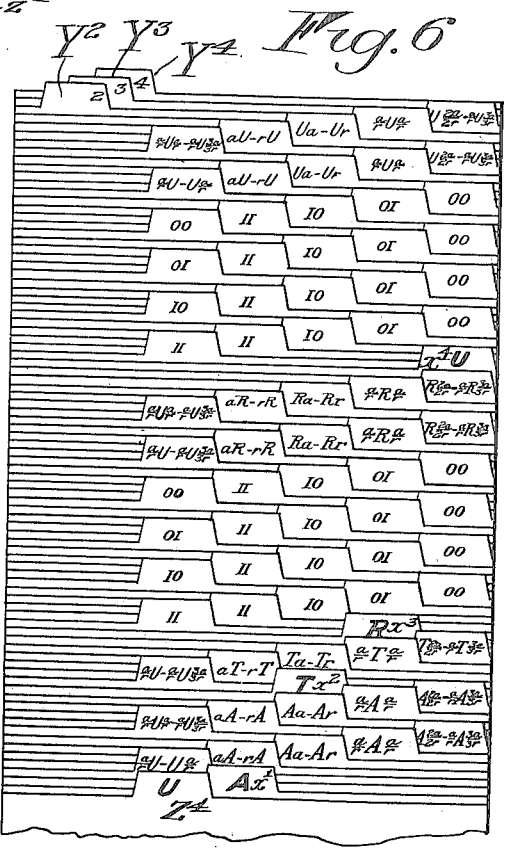
Fig. 6
INVENTOR
Frank C. Parliman
BY
ATTORNEYS F. C. PARLIMAN.
FILING DEVICE FOR FINGER PRINT RECORDS.
APPLICATION FILED NOV. 16, 1915.

1,206,362.

Patented Nov. 28, 1916.
5 SHEETS—SHEET 4.

INVENTOR
Frank C. Parliman
BY
ATTORNEYS

UNITED STATES PATENT OFFICE.

FRANK C. PARLIMAN, OF ROCHESTER, NEW YORK, ASSIGNOR TO YAWMAN & ERBE MFG. CO., OF ROCHESTER, NEW YORK, A CORPORATION OF NEW YORK.

FILING DEVICE FOR FINGER-PRINT RECORDS.

1,206,362.  Specification of Letters Patent.  Patented Nov. 28, 1916.

Application filed November 16, 1915. Serial No. 61,852.

*To all whom it may concern:*

Be it known that I, FRANK C. PARLIMAN, of Rochester, in the county of Monroe and State of New York, have invented certain new and useful Improvements in Filing Devices for Finger-Print Records; and I do hereby declare the following to be a full, clear, and exact description of the same, reference being had to the accompanying drawings, forming a part of this specification, and to the reference-numerals marked thereon.

My present invention relates to the finger print system used for identifying criminals and other persons and it has for its object to provide a simple and convenient filing device whereby the finger print records of different individuals may be filed away in such manner that different records having common major characteristics will be collected together and subdivided only in accordance with the characterictics in which they differ whereby a record can always be found instantly if its reading is known and whereby if only a part of its reading is known the field of search for it is narrowed to an appreciable degree.

To these and other ends the invention resides in certain improvements and combinations of parts all as will be hereinafter more fully described, the novel features being pointed out in the claims at the end of the specification.

Figure 1:
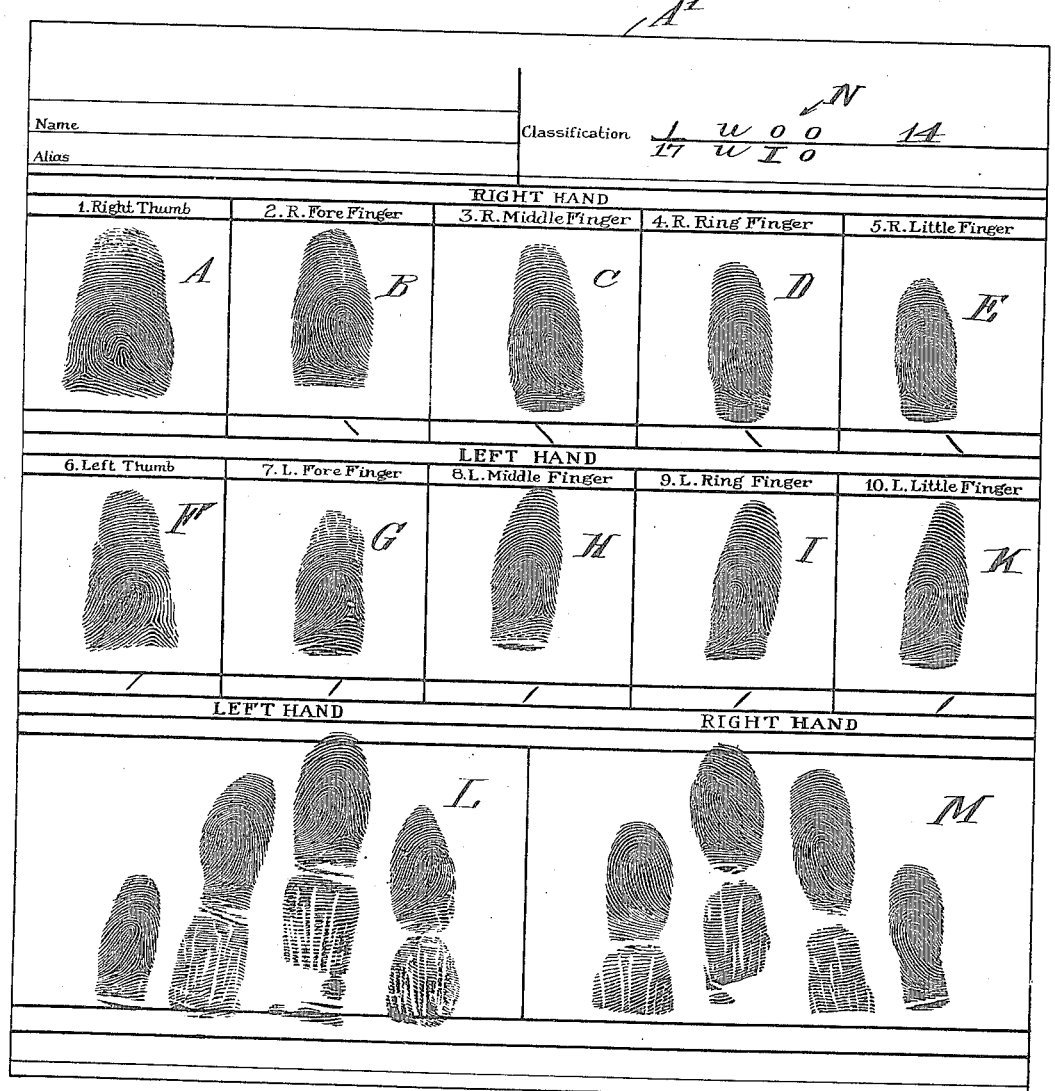
Figure 8:
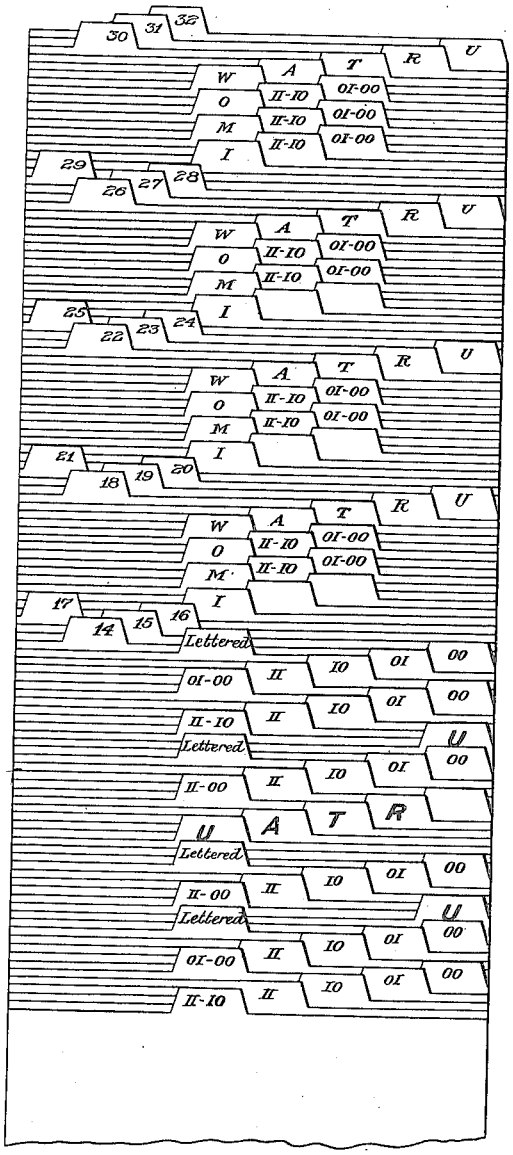
Figure 7:
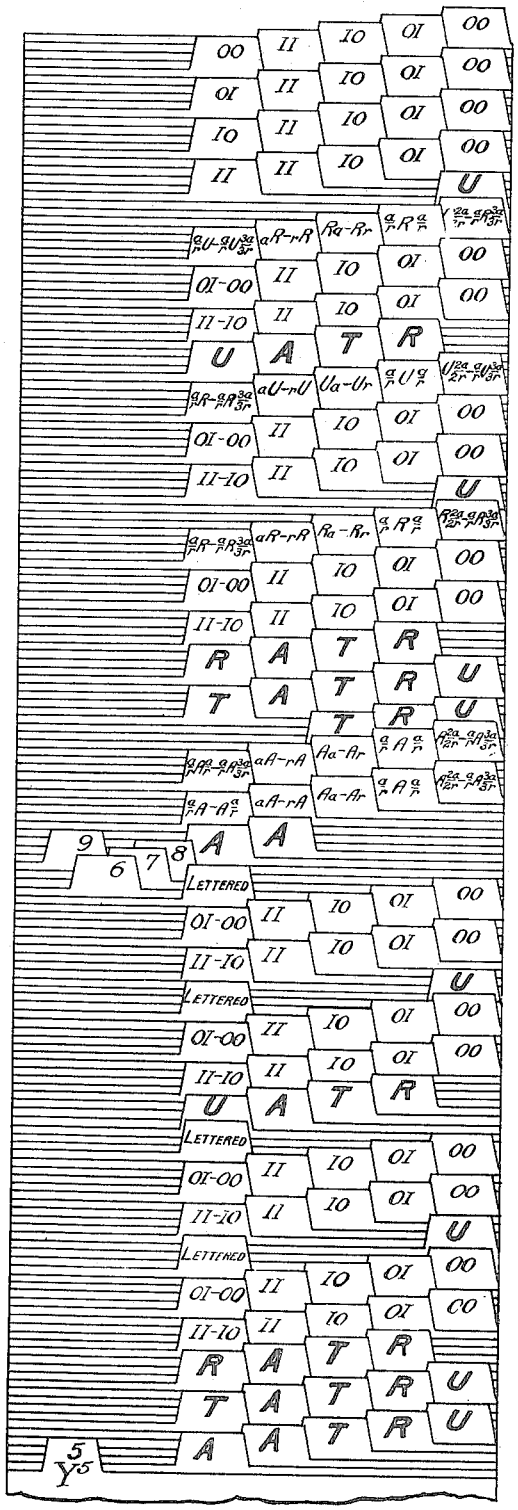
Figure 7:
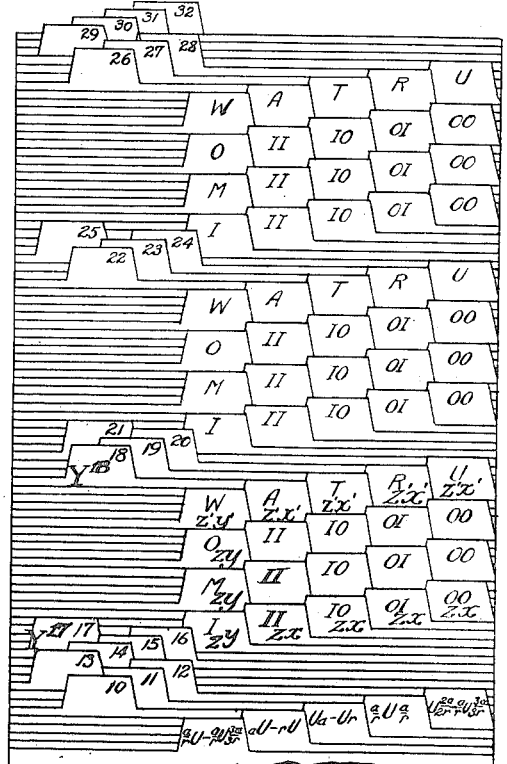
Figure 8:
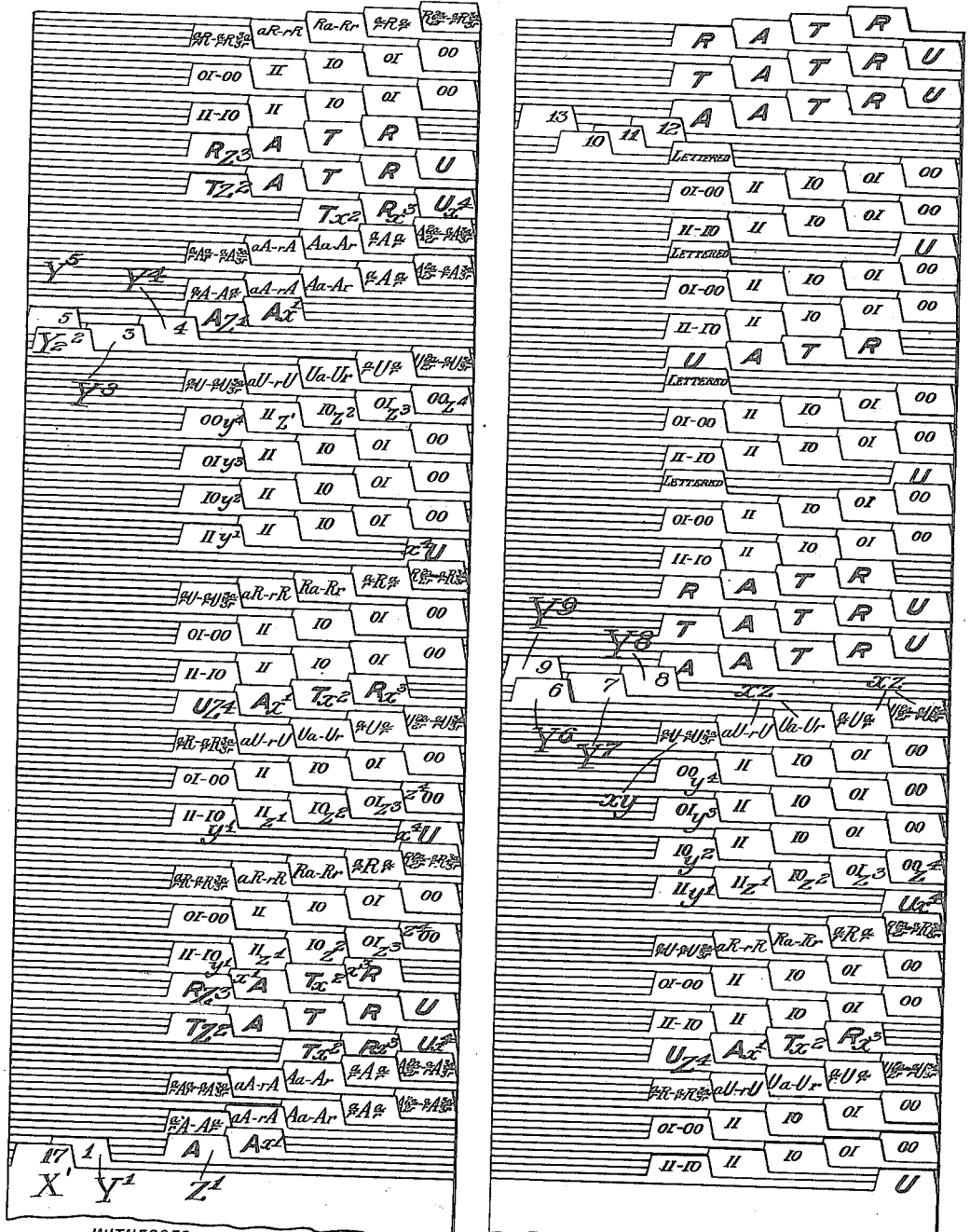

In the drawings, Figure 1 is a reproduction of a finger print record of the kind for which my device is adapted; Figs. 2, 3, 4 and 5 are detail reproductions of different types of finger prints that have been found by experience to be of more or less common occurrence in individuals; Figs. 6 and 7 jointly constitute a diagrammatic view of a portion of a filing device for classifying the records, illustrating one embodiment of my invention, and Fig. 8 is a similar view of another portion of the device.

Similar reference numerals throughout the several figures indicate the same parts.

While the filing arrangements that my invention provides are relatively simple, at least a partial familiarity with the whole finger print system is required to gain an understanding of its purposes and use and hence I will endeavor to explain in a general way the fundamental idea of what is known as the Henry system of making finger prints and classifying them to the extent of deriving a representation formula for each.

As shown in Fig. 1, the record of an individual is usually placed upon a card A' divided into two horizontal rows of block spaces A, B, C, D, E, and F, G, H, I, K, respectively. In the first row are recorded the separate impressions of the thumb and fingers of the right hand with the thumb at the left and the little finger at the right, while in the second row are similarly recorded the separate impressions of the left hand with the records of corresponding fingers or digits of the two hands below each other. At the bottom of the card may be arranged the joint impressions of the fingers only of both the left and right hand as shown at L and M, but these are seldom consulted in the matter of classification. The classification itself, that is, the expression in numbers and letters that represents a reading of the record, is expressed in a fraction or formula as indicated at N at the upper right hand corner of the card. The numerals in the numerator and denominator at the left of the fraction constitute what is known as the primary classification expression and are derived in the following manner:

The principal recognized types of prints are "whorls", "arches", "tented-arches" and loops shown, respectively, in Figs. 2, 3, 4 and 5. Each has its related modifications that are appropriately named but classified with them though these modifications may be formed into subordinate groups and become of importance in narrowing down the certainty of identification. It is thought unnecessary to digress in this direction, particularly at present, further than to say that loops are of two kinds accordingly as their trend or sweep is toward the thumb or toward the little finger and hence toward the ulnar bone or toward the radius bone of the forearm. They are referred to as "ulnar" or as "radial" loops as the case may be. Whorls are indicated by the letter "W"; arches by the letter "A"; tented-arches by the letter "T"; radial loops by the letter "R", and ulnar loops by the letter "U". Only whorls and their modifications are taken into consideration in arriving at the primary classification. A whorl consists of a print in which some of the ridges make a turn through at least one complete circuit as shown in Fig. 2.

The two rows of impressions from the two hands are read in pairs as follows: right thumb and right index; right middle and right ring; right little and left thumb; left index and left middle; left ring and left little finger, and to produce the numerical fraction of primary classification, in which the first unit of each pair figures in the denominator and the second in the numerator, the presence of a whorl is given a different numerical value accordingly as it occurs in the first, second, third or fourth pair. The first pair counts 16; the second pair 8; the third pair 4; the fourth pair 2, and the fifth pair 1. If the whorl occurs in the first unit of the pair, that is (referring to the drawings) at A, C, E, G or I it is added to the denominator and if in the second unit at B, D, F, H, or K it is added to the numerator of the fractional expression $\frac{"1"}{1}$ which is used to start with. Thus if there is no whorl present throughout the two hands the numerical expression of primary classification will be simply $\frac{"1"}{1}$. If there is a whorl, for instance, at C (first unit, second pair) it will be $\frac{1}{1+8}$ or $\frac{1}{9}$ and if there is a whorl at C as stated, and also one at H, for instance, it will be $\frac{1+2}{1+8}$ or $\frac{3}{9}$, and so on.

In the simple record card shown in Fig. 1, there is no true whorl present but the impression at A is regarded as a whorl for purposes of primary classification though it is technically what is known as a "lateral pocket loop" represented by the letters "L P", this being one of the modifications referred to above. As this occurs in the first unit of the first pair A—B, its value is 16 and there being no other whorls or their modifications present the primary classification is therefore $\frac{1}{17}$ as shown at the top of the card.

The secondary classification takes into account not only whorls but arches, tented-arches and both radial and ulnar loops and is built upon, first, their appearance or non-appearance in a certain digit of each hand and then, as a further sub-classification, in other digits or else certain characteristics of the first digit with or without characteristics of other digits are noted under certain circumstances according to a scheme that will be later described.

Figure 3:
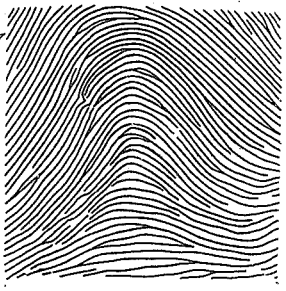

An arch has the form shown in Fig. 3 of the drawings, the ridges of the skin being waved in the form of an arch on a more or less gentle curve.

Figure 4:
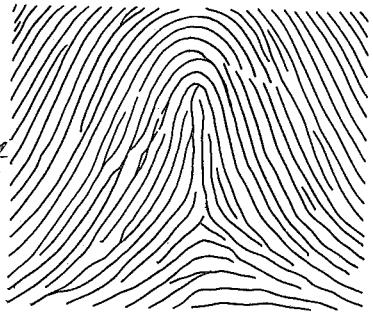

A tented-arch is as shown in Fig. 4. It has the waved appearance of an arch in part but the crest is more pointed or abrupt with respect to the inner lines like a tent or letter "A".

Figure 5:

A loop is shown in Fig. 5. The ridge lines will be seen to double back upon themselves more abruptly than in the case of an arch and instead of being symmetrical like the latter, the loop has a sweep toward either the right or left and must therefore be either "ulnar" or "radial" as previously described. Thus, if the impression of Fig. 5 were that of the right forefinger it would be a radial loop and if of the left forefinger, it would be an ulnar loop. The direction of the loop is usually indicated on the card by a short oblique line as shown at 2 in the drawings. For this purpose of forming a second lettered fraction adjacent to the numerical fraction of the primary classification, the index finger of each hand is taken, that of the right hand contributing the numerator and that of the left hand the denominator. This reading of the index fingers is called the "fulcrum" and may read $\frac{A}{A}$ indicating an arch in each forefinger; $\frac{R}{U}$ indicating a radial loop in the right forefinger and an ulnar loop in the left forefinger; $\frac{A}{T}$ indicating an arch in the right forefinger and a tented-arch in the left forefinger and so on. Returning again to the classification formula shown on the card represented in Fig. 1, the "fulcrum" is $\frac{U}{U}$ meaning that there is an ulnar loop in the right forefinger and in the left forefinger also as can be seen at B and G in the drawings.

Roughly speaking, about 95% of impressions are either loops or whorls and hence there is a system of further differentiating or subdividing these types. With respect to loops it is based upon counting the number of ridges across the loop and accordingly as the total is greater or less than a certain number, it is termed "inner" represented by the capital letter "I", or "outer" represented by the capital letter "O". With respect to whorls it is based upon tracing a certain ridge and determining whether it "meets" a certain other ridge or point or passes on the "inner" or "outer" side thereof, the symbols being, respectively, the capital letters "M", "I" and "O". When these qualifications relate to the "fulcrum" or index fingers they are placed immediately to the right of the symbol indicating the type of loop. Thus, on the formula of Fig. 1, the secondary classification shows that the ulnar loop on the right forefinger is "outer"

and the ulnar loop on the left forefinger "inner" by the expression $\frac{O}{I}$ of $\frac{UO}{UI}$.

The fingers to the right and left of the index fingers or "fulcrum" may also have their characteristics noted, particularly the middle finger of each hand. This is done when the type of print is the same as on the index finger. In the case of both being loops, ridge counting is used and the added fraction is placed at the right of the ridge indication of the forefinger. In the sample formula of Fig. 1, the expression is $\frac{O}{O}$ indicating that both middle fingers are loops and that both are "outer" loops. This completes explanation of the meaning of the formula referred to, namely, $\frac{1}{17}$, primary classification, $\frac{U}{U}$ the forefingers of each hand, $\frac{O}{I}$ characteristics of the forefingers, and $\frac{O}{O}$ characteristics of the middle fingers.

It will be seen that the types of prints are symbolized by their capital letters in the formula only, with respect to the index fingers and this is always true, except where the forefingers are neither arches of either kind or loops of either kind. When there is a whorl in the "fulcrum" it is understood from the absence of a letter and the expression may read thus: $\frac{27}{12}$ $\frac{MO}{OM}$ showing that the index and middle fingers of both hands are whorls.

When arches of either kind occur in the forefingers, neither ridge counting nor ridge tracing applies, so instead of setting forth characteristics of these fingers, the types of prints present in the middle, ring and little fingers and even the thumb, are set forth. These are indicated by small letters placed at the left of the "fulcrum" letters in the case of the thumb and at the right in the case of the last three fingers to correspond with the print record arrangement. In fact, as arches constitute only about 5% of all prints, their presence in any instance is sufficient in itself to provide a long step in the direction of subclassification. They may be more effective than ridge counting and hence the expression $\frac{13}{2}$ $\frac{aU}{U}$ may be utilized to indicate an arch in the right thumb instead of indicating the results of ridge counting in the ulnar loop of the right forefinger.

A typical arch record is the following: $\frac{1}{17}$ $\frac{aA}{aAa}$. This indicates arches in both forefingers (the fulcrum), the thumbs of both hands and the middle finger of the left hand. If there were also arches in all three of the fingers of the right hand to the right of the index finger, the formula might be written thus: $\frac{1}{17}$ $\frac{aA3a}{aAa}$.

The foregoing is but a brief and general exposition of the system through which the expression or formulæ that it is the purpose of my invention to provide a filing system for, are arrived at, but it is believed that it will be sufficient to give an understanding of the manner in which the device I have produced is used and the reasons for its various provisions.

My invention is preferably embodied in a vertical filing system as indicated in Figs. 6, 7 and 8 and the inventive idea lies in the arrangement and entitling of the guide parts. Such record systems, as a whole, and their general manner of use are too well known to take time for description here. I contemplate comprising the record within a number of drawers, of which the first, second and sixth are shown in Figs. 6, 7 and 8, respectively, as specimens. It is believed to be unnecessary to show the rest as the same scheme is repeated in substance at different points throughout and it is thought that the drawings would be needlessly multiplied if all were shown.

The dominating guide parts are those representing the primary classification, first described, in terms of numerical fractions as they appear at the left of the card formulæ N (Fig. 1). The denominators are controlling and form the titles of a series of first guide cards X—X' (those shown being the first and seventeenth of the present embodiment). The numerators form the titles of the next subordinate guide cards marked Y'—Y² etc. A little computation will show that with the values of 16, 8, 4, 2 and 1 given to the presence of whorls in the different fingers or pairs of fingers in primary classification, plus the single unit used to start with, the maximum primary fraction will be $\frac{32}{32}$. I therefore provide one series of primary guide cards X, running from 1 to 32, and 32 series of subordinate primary guide cards Y'—Y², etc., running from 1 to 32, one of which last mentioned series is subordinate to each unit of the series X. Under the first unit bearing the character "1" of the series X—X', etc., as shown jointly by Figs. 6 and 7 (the latter figure being a continuation of the first), will be placed all records having formulæ in which the denominator of the primary classification is "1", while according to the numerator, whatever it may be, from 1 to 32, the record will be placed behind one of the cards of the series Y'—Y², etc.

Subordinate to some of the units of the subordinate primary guides Y'—Y², etc., are placed groups containing four coördinate guides Z′—Z², etc., which bear the characters representing, respectively, arches, tented-arches, radial loops and ulnar loops. These represent possible readings of the right forefinger of the "fulcrum" and behind each is filed all records in which the first capital letter of the numerator of a formula corresponds to its title. Thus, all records having the primary classification $\frac{"1"}{1}$ and a radial loop in the right forefinger $\frac{(1R)}{1}$ will go behind the guide marked Z³ in Fig. 6.

Subordinate to each unit of the series Z′—Z², etc., is placed, in certain instances, a group $x^1$—$x^2$—$x^3$—$x^4$ composed of the same units as its superior group or series Z¹—Z², etc., that is, bearing the same characters A, T, R and U. These represent possible readings of the left forefinger of the "fulcrum" and behind each is filed the records in which the first capital letter of the numerator of a formula corresponds to its title. Thus, if the record having the formula $\frac{1R}{1}$ noted above also shows a radial loop in the left forefinger $\left(\frac{1R}{1R}\right)$, it will go behind the card marked X³ in Fig. 6.

This last mentioned group $x^1$—$x^2$—$x^3$—$x^4$, composed of four guide cards, has two of them devoted to loops, namely, the card bearing the character "R" and that bearing the character "U". These are each further subdivided in some instances to take care of the ridge counting expressions at the extreme right of the fractional formula such as $\frac{1\ \ R\ \ 10}{1\ \ R\ \ 01}$. I therefore provide a group of coördinate guides $y^1$—$y^2$—$y^3$—$y^4$ subordinate to $x^3$ and $x^4$ units bearing these characters R and U, under each of which is another group $z^1$—$z^2$—$z^3$—$z^4$ of the same nature. The $y′$, etc., group directs the filing according to the numerator of the part of the fraction at the right denoting ridge counting characteristics and the group $z′$, etc., under it directs the filing according to the denominator. Thus, with the formula last mentioned, the record which we have stated would go behind $x^3$ would further be traced behind $y^2$ which guide card bears the expression "10" and again back of the guide card $z^3$ bearing the character "01". Behind the last mentioned guide would be the ultimate resting place, therefore, of a record having the formula $\frac{1R10}{1R01}$.

In the same manner groups $xy$ coördinate with the groups $y′$, etc., and having subordinate groups $xz$ may be provided under the "radial" and "ulnar" cards of the series $x′$, etc., as shown in Fig. 6, to take care of formulæ made out in terms of the prints of the other fingers of the hand instead of ridge characteristics of the forefingers and middle fingers as heretofore explained.

To summarize, a card such as that shown in Fig. 1 is filed first behind the guide bearing its numerical denominator, then behind the guide bearing its numerical numerator; thence behind the guide bearing its lettered numerator, denoting the right forefinger reading; thence behind the guide bearing its lettered denominator indicating the left forefinger reading, thence behind the guide bearing the forefinger and middle finger characteristics, jointly, of the right hand at the right of the fraction and ultimately behind the guide bearing the forefinger and middle finger characteristics, jointly, of the left hand. Taking the formula of the card actually shown in Fig. 1, its filing would develop the following course in Fig. 8 with reference primarily to the reference letters X′, Y′, Z⁴, $x^4$, $y^4$ $z^2$ behind which last mentioned guide it would be placed.

It will be noted that there is no particular uniformity in the subdivisions supplied under coördinate units of the same series. For instance, under numerator number 2, primary classification, of series Y, etc., (Fig. 8) there are no subdivisions at all and hence any formula having the primary classification $\frac{2}{17}$ would be placed behind the card Y² no matter what combination of letters followed in the fraction. This is because it is so unusual to have a whorl in the right thumb and left little finger, only, that the accumulation of records under this guide would be very small and further subdividing is not necessary. Again, a faithful uniformity in the subdivisions and subordinate guides throughout all the series would make provision for impossible formulæ in many instances which would be useless. A formula that could never occur would be the following: $\frac{17\ \ U\ \ 01}{1\ \ U\ \ 01}$, for the reason that the primary classification indicates a whorl in the right forefinger $\frac{(16+1)}{1}$ and hence there could not be an ulnar loop in that forefinger as indicated by the secondary classification. Therefore, referring to Figs. 6 and 7, there is no series of guides Z′—Z²—Z³—Z⁴ for arches, tented-arches, radial loops and ulnar loops under the primary guide marked Y¹⁷ and bearing the character "17" for the numerator index of the guide X indicating the denominator index "1". Instead, there is a group of coördinate guides $xy$ behind Y¹⁷ bearing the characters I, M and O which are characteristic of whorls as before described. These are further subdivided at $zx$ in the same manner as loops and arches would be for further subclassification. With reference to the card shown at $z'\ y'$ in rear of the cards $z$—$y$ and coördinate therewith, this likewise provides for whorls in the right forefinger but only when accompanied by an arch or loop in the left forefinger not designatable further in subclassification of the kind shown at $z$—$x$. The group $z'$—$x'$ under the card $z'$—$y'$ therefore takes care of such sub-formulæ as $\frac{W}{R}$, $\frac{W}{T}$, etc.

The whole device has been planned in accordance with the probability of occurrence of various combinations and while, as stated, the provision of various minor subclasses has been omitted in some instances, even though there is a possibility of their being utilized, it is only because the accumulation of records under the last subdivision that actually is provided would be so small in an ordinary collection of finger prints that no difficulty would be had in quickly running them through. The device I have illustrated could even be condensed with advantage for very small collections and could be expanded for an unusually large one, but it has been designed for the maximum requirement of police departments and similar bureaus of the present day.

I claim as my invention:

1. A filing device for finger print records comprising a plurality of series of primary guides, all but one of which series are subsidiary respectively to the units of the remaining series, and each unit of each series bearing one of a set of characters representative of the joint readings of two hands according to the occurrences of one type of print in different positions in the sequence of digits, a group of coördinate secondary guides subsidiary to one or more units of each subsidiary series of primary guides and each bearing a character representative of a different type of print in a given digit of one hand, a second group of guides corresponding to the first named group and bearing the same characters as applied to the corresponding digit of the other hand, subsidiary to one or more units of said first named group, a series of guides bearing duplicate characters representative of characteristics of the several types of prints comprised by the said second group arranged to be subsidiary to one or more units of said group, and a plurality of like guides subordinate to each unit of said last mentioned series.

2. A filing device for finger print records having formulæ derived in accordance with the Henry system comprising thirty-three series of primary guides, the units of which are numbered from one to thirty-two all but one of which series are subordinate respectively to the units of the remaining series, a group of four coördinate secondary guides subordinate to one or more units of each subordinate series of primary guides and bearing, respectively, the characters representative of arches, tented-arches, radial loops and ulnar loops, a second group of four guides bearing, respectively, the same characters as the first mentioned group and subordinate to one or more units of that group and a plurality of guides bearing characters representative of different characteristics of arches, tented-arches, radial loops and ulnar loops subordinate to one or more units of said last mentioned group.

3. A filing device for finger print records having formulæ derived in accordance with the Henry system comprising thirty-three series of primary guides the units of which are numbered from one to thirty-two, all but one of which series are subordinate, respectively, to the units of the remaining series, and a series of secondary guides subordinate to one or more of the subordinate primary guide units and bearing characters representative of the print characteristics of the fulcrum fingers.

4. A filing device for finger print records having formulæ derived in accordance with the Henry system comprising a plurality of series of guides successively subordinate to each other and bearing, respectively, entitling characters representative of the following parts of the formulæ in the order named: the numerical denominator; the numerical numerator; the numerator of the fulcrum and the denominator of the fulcrum.

5. A filing device for finger print records having formulæ derived in accordance with the Henry system comprising a plurality of series of guides successively subordinate to each other and bearing, respectively, entitling characters representative of the following parts of the formulæ in the order named: the numerical denominator; the numerical numerator; the numerator of the fulcrum; the denominator of the fulcrum; the collective numerator of finger type characteristics and the collective denominator of finger type characteristics.

FRANK C. PARLIMAN.

Witnesses:
RUSSELL B. GRIFFITH,
AGNES NESBITT BISSELL.